March 30, 1926.  1,579,178
H. R. REYNOLDS
SHAFT HANGER
Filed May 19, 1925
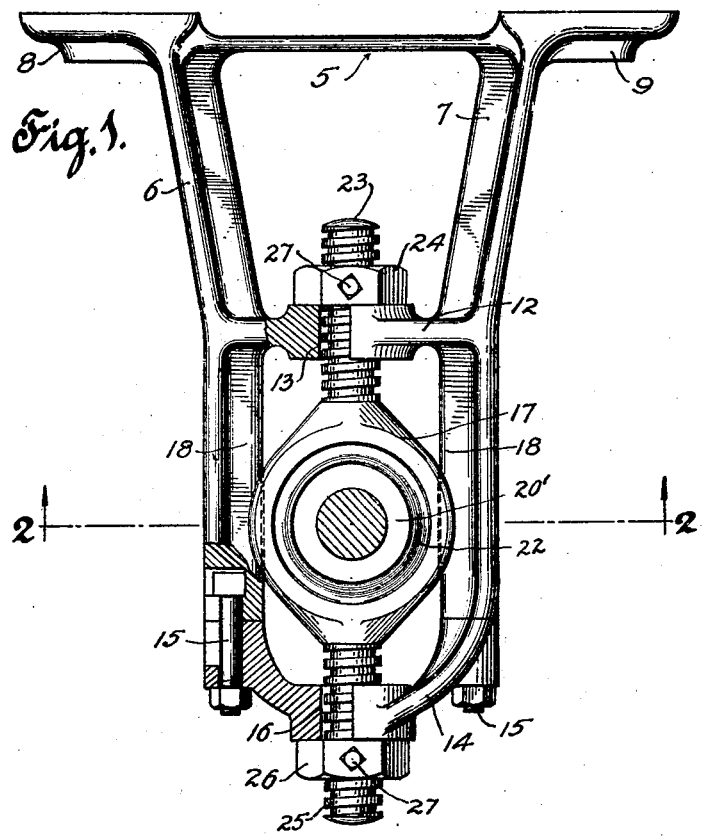
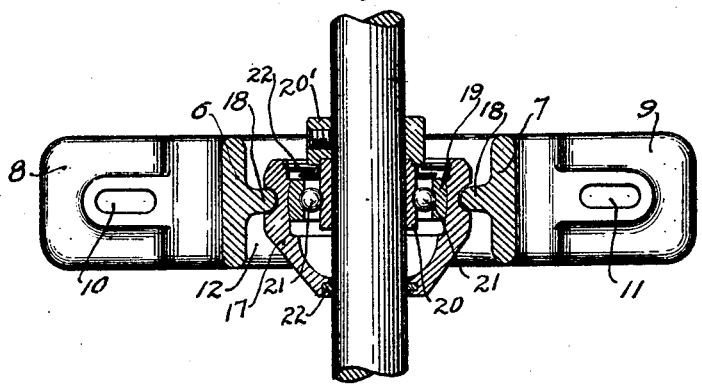
INVENTOR
Harry R. Reynolds
BY
Mitchell Bechert
ATTORNEYS.

Patented Mar. 30, 1926.

1,579,178

UNITED STATES PATENT OFFICE.

HARRY R. REYNOLDS, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

SHAFT HANGER.

Application filed May 19, 1925. Serial No. 31,260.

*To all whom it may concern:*

Be it known that I, HARRY R. REYNOLDS, a citizen of the United States of America, residing at New Britain, Connecticut, have invented a new and useful Shaft Hanger, of which the following is a specification.

My invention relates to a shaft hanger.

It is the general object of the invention to improve the construction of a shaft hanger and to provide a simple, sturdy shaft hanger in which a self-aligning bearing may be employed without danger of distorting the bearing housing so as to adversely affect the self-alignment of the bearing.

Briefly stated, in the preferred form of the invention I employ a hanger frame which carries an anti-friction bearing housing. An anti-friction bearing preferably of the self-aligning type is mounted in said housing and the housing is suspended or supported by one or more rods or the like, the axes of which preferably pass substantially through the axis of the anti-friction bearing so as to suspend the housing and thus prevent undue distortion of the same as would ordinarily be the case when screws are employed which compress the housing.

In the drawings which show for illustrative purposes only, a preferred form of the invention:

Fig. 1 is an end view in partial section of a shaft hanger illustrating features of my invention;

Fig. 2 is a sectional view taken substantially in the plane of the line 2—2 of Fig. 1.

5 designates generally a hanger frame including legs 6—7 which may be of T-section. 8—9 indicate feet provided with elongated slots 10—11 for the reception of securing bolts or the like for holding the frame in place on a suitable support, the elongated slots providing for a limited sidewise adjustment of the frame. The frame may have a web 12 extending between the legs 6—7 which web is provided with a smooth bore 13 for a purpose to be later described. A cap 14 is secured to the legs 6—7 as by means of bolts 15—15 as will be clear from Fig. 1. The cap 14 may also have a smooth bore 16 extending therethrough and preferably in alignment with the corresponding bore 13 in the web 12.

A bearing housing 17 is supported between the legs 6—7 and in the form shown webs 18—18 on the legs 6—7 extend inwardly and form guides fitting in suitable guide-ways or notches in the sides of the bearing housing as will be clear from the drawings. The housing 17 may house an anti-friction bearing of the self-aligning type and for that purpose the inner surface of the housing is formed as a part of the surface of a sphere for accommodating the outer spherical surface or an outer bearing ring 19. 20 designates an inner bearing ring which is designed to fit on a shaft and to be held thereon by any suitable means, 20'. Anti-friction members such as balls 21—21 are interposed between the two bearing rings in the usual way.

Any suitable type of end closure or dust ring 22 may be employed for closing the ends of the housing for preventing the entrance of dust and dirt into the housing. These end closures should be of a form to permit the slight self-alignment required by the deflection of the shaft secured in the inner ring.

Now, in the usual construction of shaft hanger the housing is held in place by screws which engage the housing and compress the same. In a hanger of this type when a single bearing is employed the compression of the housing may distort the same to some extent and thus cramp the self-aligning bearing and thus materially affect its usefulness. One of the main features of my invention resides in overcoming that difficulty and the method I employ consists in suporting the housing on the frame in such a manner that it is not put under compression so as to bind the self-aligning bearing. In the particular form shown I provide a rod 23 on the end of the housing which rod is preferably though not necessarily cast or formed integrally wth the housing. This rod is preferably threaded and passes through the smooth bore 13 in the web 12 on the outside of which a nut 24 is screwed onto the rod and engages the side of the web 12. Obviously with the hanger frame mounted vertically as shown in Fig. 1, the housing will be suspended on the rod 23 which rod and at least a part of the housing will be under tension. The tendency to distortion of the housing will, therefore, be substantially absent and the outer ring 19 in the housing will be free to slide during the deflection of the shaft. In order to position the housing in the frame securely I preferably provide a second threaded rod 25 at the opposite side of the housing 17 and this rod passes through the smooth aperture 16 in the cap 14 on the outside of which the rod receives a nut 26. The rods are preferably in alignment with each other and the axes thereof pass substantially through the axis of the anti-friction bearing. Therefore, by means of the threaded rods and nuts, the housing may be positioned vertically within the frame and since the nuts 24—26 position the same in opposite directions, the housing will be held in predetermined adjusted position. It is impossible with a construction as shown to place the housing under compression by means of the threaded rods 23—25. Set screws or the like 27—27 may be employed for locking the nuts 24—26 in position on their respective screws.

It will thus be seen that with a shaft hanger as herein disclosed there will be little or no tendency to distortion of the bearing housing and the bearing is free to align itself in accordance with the position of the shaft caused by deflection thereof. The bearing and shaft may be readily assembled or disassembled and the shaft will be securely yet adjustably held in the hanger frame.

While the invention has been described in some detail, I do not wish to be confined to the form shown since changes may be made within the scope of the invention as defined in the appended claims.

I claim:

1. In a shaft hanger, a hanger frame having guides thereon, a bearing housing positioned by said guides, a self aligning anti-friction bearing including inner and outer races with anti-friction bearing members therebetween carried by said housing, tension members secured to opposite sides of said housing and cooperating with said hanger frame, and means for tensioning said tension members to position said housing and bearing on said frame and to tension opposite sides of said housing whereby binding of said self aligning bearing in said housing will be prevented.

2. In a shaft hanger, a hanger frame having spaced apart legs forming guides, a web between said legs and having a bore therethrough, a cap removably secured to said legs and having a bore therethrough substantially in alignment with said bore through said web, a bearing housing between said legs and positioned by said guides, a self aligning anti-friction bearing including inner and outer races with anti-friction bearing members therebetween carried by said housing, screw threaded tension members on opposite sides of said housing and rigid therewith, said tension members passing through said bores in said web and cap, and nuts on said threaded tension members on the outer sides of said web and cap whereby said nuts and tension members may serve to position said housing on said frame, and said tension members may be put under tension to tension opposite sides of said housing to prevent binding of said self aligning bearing therein.

HARRY R. REYNOLDS.